United States Patent
Cooper

(10) Patent No.: US 9,010,700 B1
(45) Date of Patent: Apr. 21, 2015

(54) FOLDABLE MULTI-INSTRUMENT STAND

(71) Applicant: Coopercopia, LLC, Nashville, TN (US)

(72) Inventor: Daniel Lee Cooper, Nashville, TN (US)

(73) Assignee: Coopercopia, LLC, Nashville, TN (US)

( * ) Notice: Subject to any disclaimer, the term of this patent is extended or adjusted under 35 U.S.C. 154(b) by 163 days.

(21) Appl. No.: 13/736,585

(22) Filed: Jan. 8, 2013

Related U.S. Application Data

(60) Provisional application No. 61/584,637, filed on Jan. 9, 2012.

(51) Int. Cl.
*F16M 11/38* (2006.01)
*G10G 5/00* (2006.01)

(52) U.S. Cl.
CPC . *G10G 5/00* (2013.01); *F16M 11/38* (2013.01)

(58) Field of Classification Search
CPC ......... G10G 5/00; F16M 11/34; F16M 11/22; F16M 11/38
USPC ................. 248/166, 463, 435, 460, 462, 447; 84/327, 329, 453, 421; 211/85.6, 85, 211/195, 42–43, 149, 41.6; D6/682, 682.4, D6/312
See application file for complete search history.

(56) References Cited

U.S. PATENT DOCUMENTS

| | | |
|---|---|---|
| 1,840,620 A | 1/1932 | Dennis |
| 2,584,489 A * | 2/1952 | Morrison ...................... 211/149 |
| 3,057,591 A | 10/1962 | Weimer |
| 3,417,954 A | 12/1968 | Croninger |
| 4,917,250 A * | 4/1990 | Barbieri et al. ................ 211/149 |
| 4,943,021 A | 7/1990 | Cien et al. |
| 5,149,901 A * | 9/1992 | Boor et al. ....................... 84/327 |
| 5,350,143 A | 9/1994 | Hoshino |
| 5,383,634 A | 1/1995 | Liao |
| 5,505,413 A | 4/1996 | Hennessey |
| D370,369 S * | 6/1996 | Nordstrom ..................... D6/466 |
| 5,664,756 A | 9/1997 | Liao |
| 5,722,507 A * | 3/1998 | Kain ............................. 182/129 |
| 5,744,735 A | 4/1998 | Liao |
| 5,836,552 A | 11/1998 | Yu |
| 5,957,417 A | 9/1999 | Yu |
| 5,973,244 A | 10/1999 | McCulloch |
| D436,465 S | 1/2001 | Berkman |
| 6,323,406 B1 | 11/2001 | Park |
| 6,412,742 B1 | 7/2002 | Yu |
| 6,439,532 B1 | 8/2002 | Yu |
| 6,533,228 B1 | 3/2003 | Yu |
| D482,904 S | 12/2003 | Slaymaker |

(Continued)

*Primary Examiner* — Ingrid M Weinhold
(74) *Attorney, Agent, or Firm* — Stites & Harbison, PLLC; David W. Nagle, Jr.; James R. Hayne

(57) ABSTRACT

A foldable multi-instrument stand includes: a first main support leg; a second main support leg; a first pair of vertical support members configured for pivotal movement into an upright orientation relative to the first and second main support legs when the stand is in a deployed position; and a second pair of vertical support members configured for pivotal movement into an upright orientation relative to the first and second main support legs when the stand is in the deployed position. The first main support leg and the second main support leg each define one more support ledges for accommodating and providing support to multiple instruments when the stand is in the deployed position. The areas above such support ledges further define cavities for receiving the pairs of vertical support members when the stand is in a storage position.

11 Claims, 12 Drawing Sheets

(56) References Cited

U.S. PATENT DOCUMENTS

| | | |
|---|---|---|
| 6,722,617 B2 | 4/2004 | Wilfer |
| 6,800,798 B2 * | 10/2004 | Hsieh ............................... 84/327 |
| D538,554 S * | 3/2007 | Tai ................................. D6/466 |
| D557,329 S * | 12/2007 | Lippert .......................... D17/20 |
| 7,470,843 B2 | 12/2008 | Hsieh |
| 7,514,616 B2 * | 4/2009 | Sawhney ........................ 84/327 |
| D596,875 S * | 7/2009 | Small et al. .................... D6/466 |
| 7,777,110 B2 | 8/2010 | Wallis |
| 7,798,530 B1 | 9/2010 | Mercado |
| 8,146,870 B1 | 4/2012 | Cooper |
| 8,573,410 B2 * | 11/2013 | Chalifoux .................... 211/41.5 |
| 8,796,525 B2 * | 8/2014 | Sawhney ........................ 84/453 |
| 2004/0144233 A1 * | 7/2004 | Hsieh .............................. 84/327 |
| 2005/0121567 A1 | 6/2005 | Meuniot |
| 2009/0188372 A1 * | 7/2009 | Sawhney ........................ 84/327 |
| 2011/0107897 A1 * | 5/2011 | Sawhney ........................ 84/327 |
| 2011/0168863 A1 * | 7/2011 | Tregloan ...................... 248/435 |
| 2013/0048804 A1 * | 2/2013 | Furuta et al. ................. 248/168 |

* cited by examiner

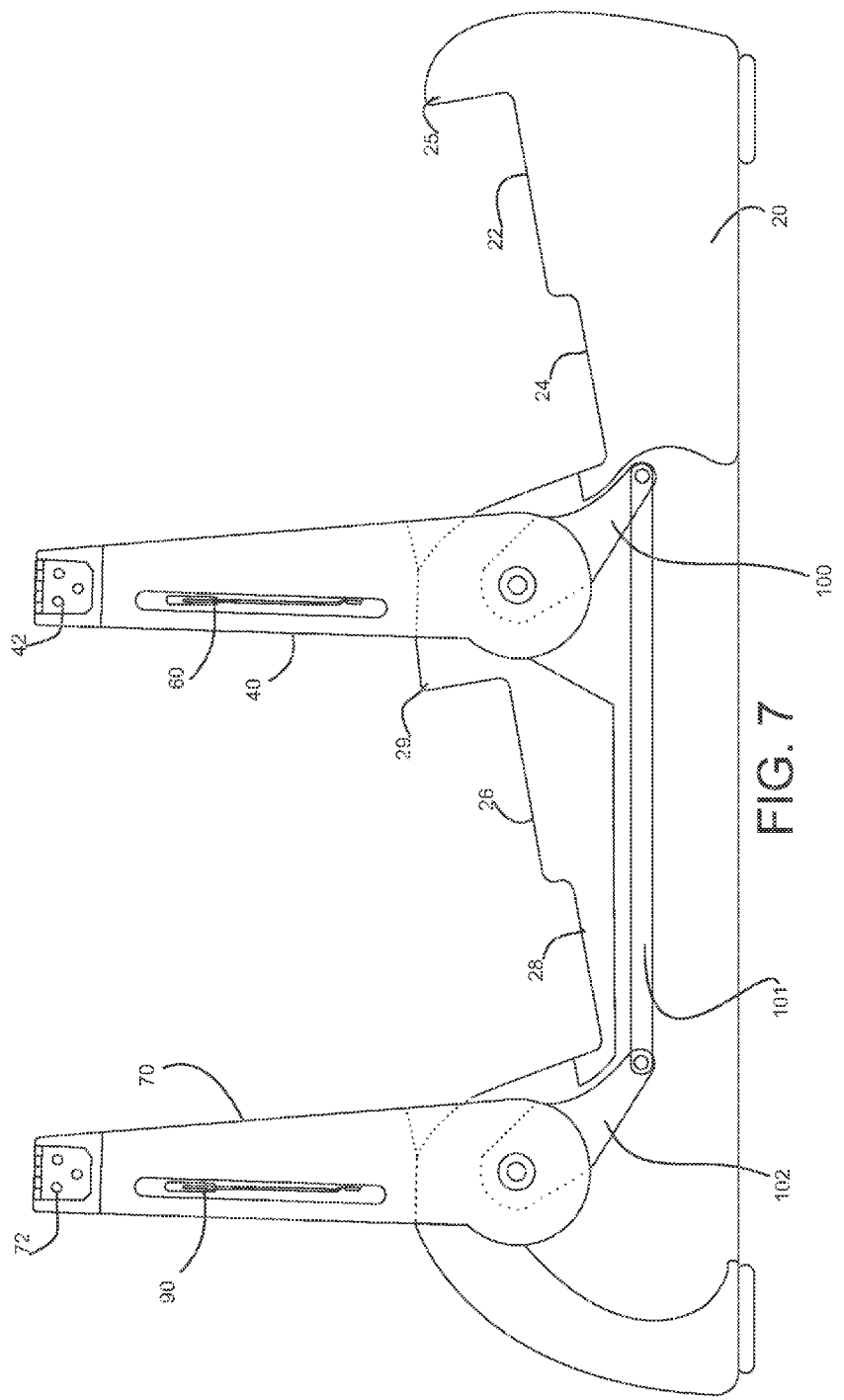
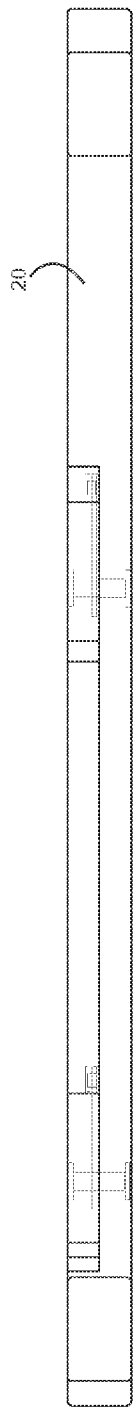
FIG. 7
FIG. 7A

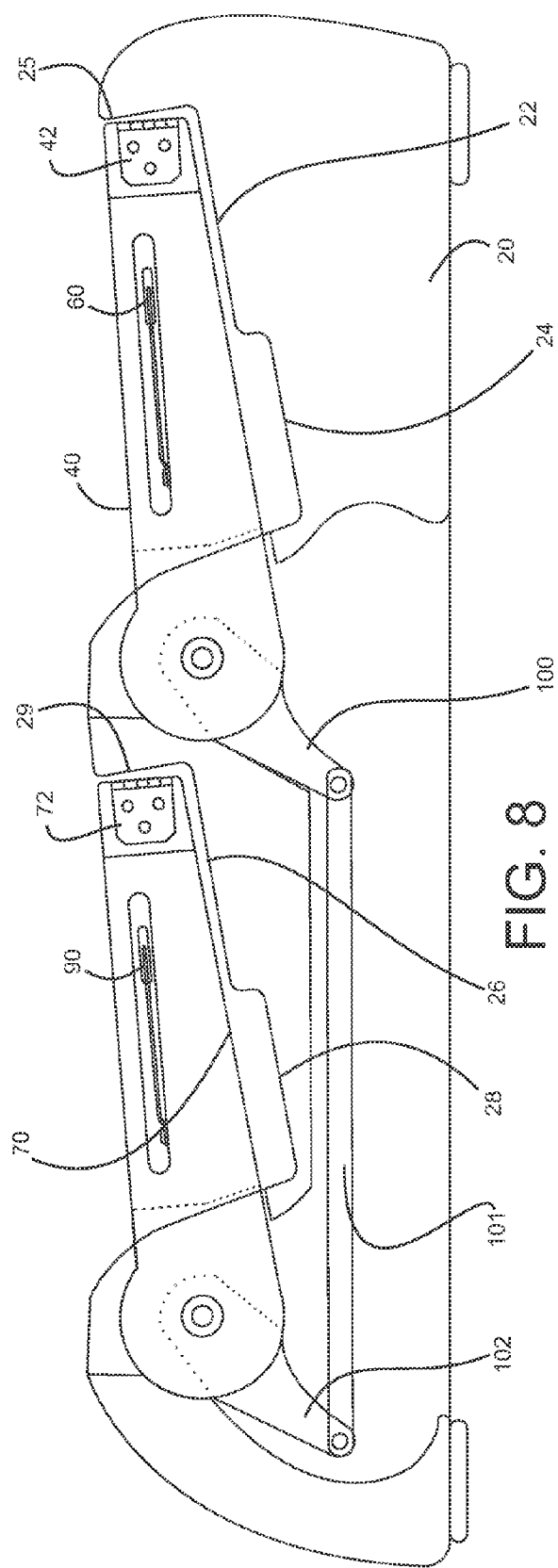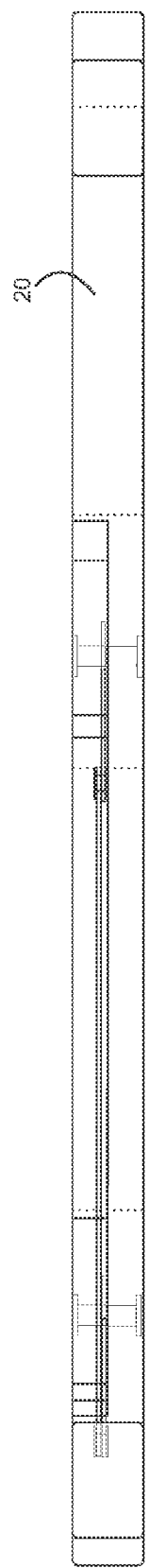

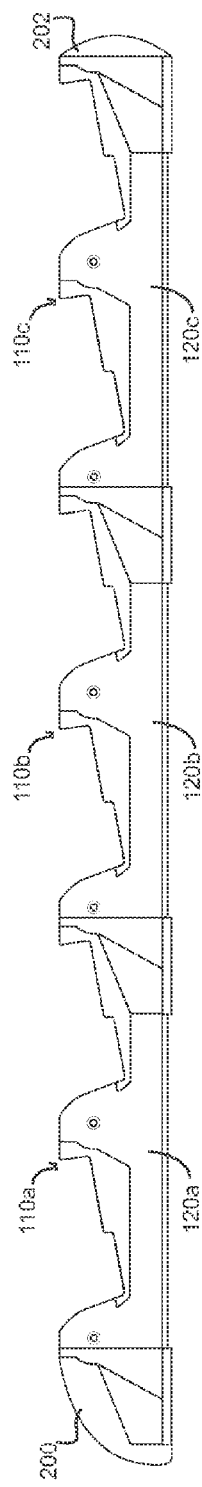
FIG. 10
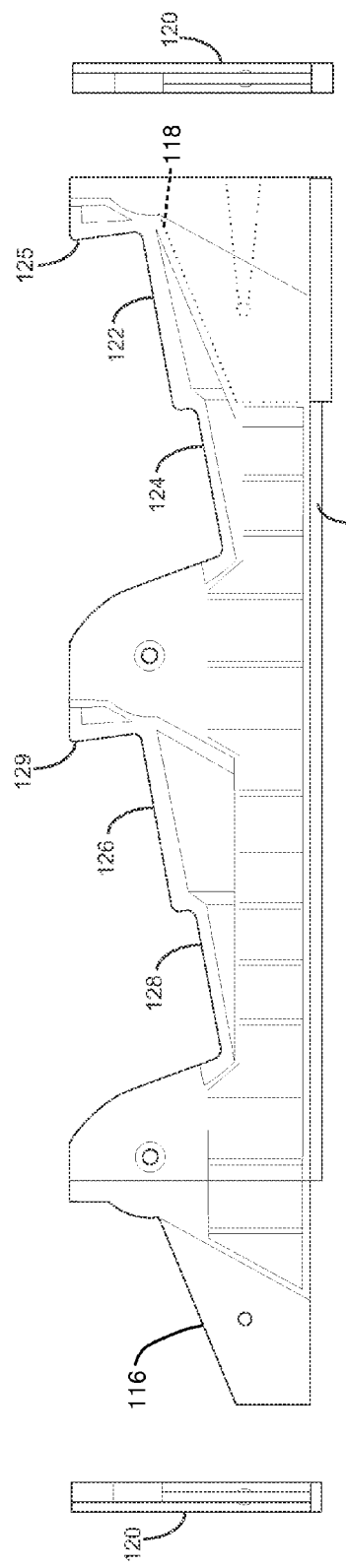
FIG. 9
FIG. 9A
FIG. 9B
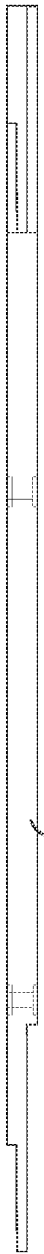
FIG. 9C

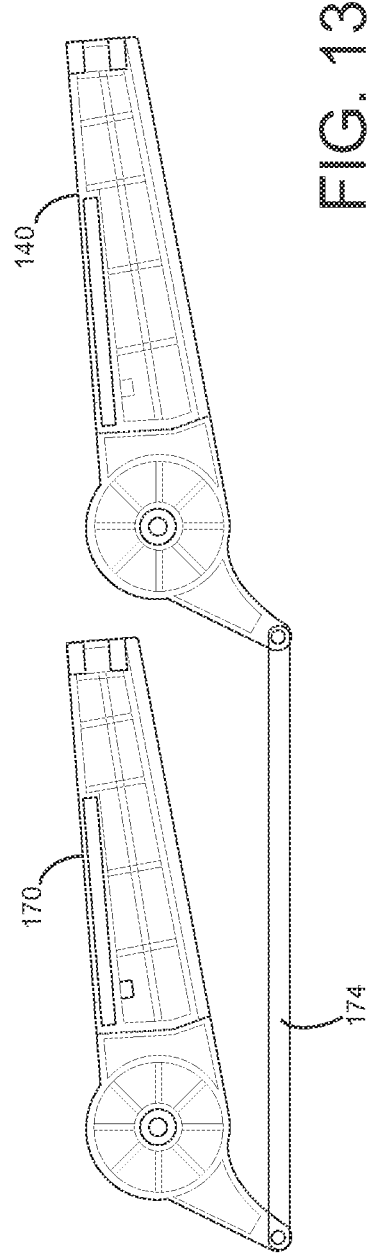

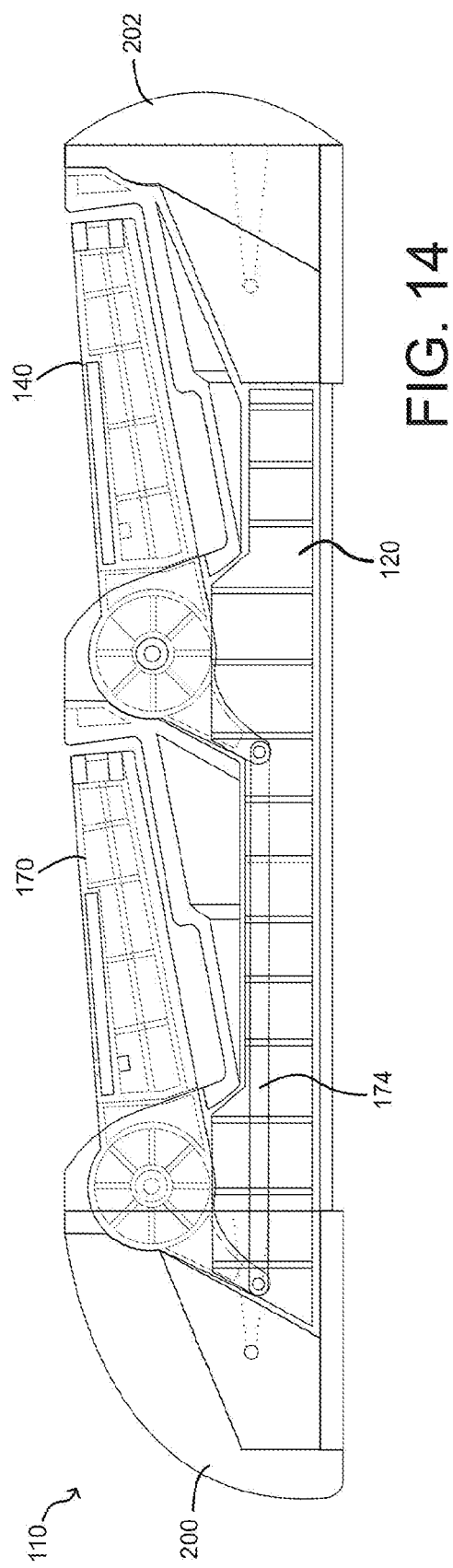

FOLDABLE MULTI-INSTRUMENT STAND

CROSS-REFERENCE TO RELATED APPLICATIONS

The present application claims priority to U.S. Provisional Patent Application Ser. No. 61/584,637 filed on Jan. 9, 2012, the entire disclosure of which is incorporated herein by reference.

TECHNICAL FIELD

The present invention relates to stands for guitars or similar musical instruments or objects.

BACKGROUND OF THE INVENTION

Stands are used to support a guitar or other instrument when it is not being played or stored in a case. However, it is quite typical, when a stand is not easily available, to see a performer lean an instrument against a wall, table, or chair. This can often result in the instrument falling over and being damaged.

Thus, commonly assigned U.S. Pat. No. 8,146,870, which is incorporated herein by reference, describes a foldable guitar stand that includes: two main support legs; two vertical support members; two rear legs; and a brace.

Each of the main support legs includes a proximate end that defines a hole to facilitate pivotal movement of the main support leg relative to the associated vertical support member. Each main support leg also defines a recess along its inner surface at its proximate end, which engages and mates with a complementary recess defined by an associated rear leg when the guitar stand is in a storage position. Each main support leg further includes a substantially flat foot portion at its distal end that engages the underlying ground surface when the guitar stand is in a deployed position. Each main support leg also defines two support ledges along its upper surface, which terminate at a stop at the distal end of the main support leg. Furthermore, the area above the support ledges effectively defines a cavity for receiving the associated vertical support member when the guitar stand is in a storage position.

Each vertical support member has an enlarged and flattened proximate end that defines a hole. This hole is placed in registry with the corresponding hole defined through the associated main support leg. At the opposite end of each vertical support member, there is a hinge portion that is secured to the inner surface of the vertical support member. The hinge portion secured to the first vertical support member is operably connected to and engages the hinge portion secured to the second vertical support member to create a butt hinge that facilitates pivotal movement of the respective vertical support members relative to one another.

Each rear leg has an enlarged and flattened proximate end that defines a hole. This hole is placed in registry with the hole defined through the associated main support leg and the hole defined through the associated vertical support member, such that a pin can be inserted through the respective holes to facilitate pivotal movement. In this regard, the enlarged and flattened proximate end of each rear leg is interposed and effectively "sandwiched" between the associated main support leg and the enlarged and flattened proximate end of the associated vertical support member. Thus, with respect to one side of the foldable guitar stand, all three of the major structural components—the main support leg, the vertical support member, and the rear leg (collectively, a first subassembly)—pivot relative to each other about a common axis defined by a first pin. Similarly, with respect to the other side of the foldable guitar stand, all three of the major structural components—the main support leg, the vertical support member, and the rear leg (collectively, a second subassembly)—pivot relative to each other about a common axis defined by a second pin.

Furthermore, each rear leg also includes a foot portion at its distal end. Each rear leg also defines a recess along its outer surface that extends from the proximate end to the distal end. This recess engages and mates with a complementary recess defined by the main support leg when the guitar stand is in a storage position.

Finally, the brace extends between and connects the vertical support members.

In a deployed position, each of the main support legs is rotated about the respective axes defined by the pins to a position in which a substantially flat foot portion at the respective distal ends of the main support legs can engage the underlying ground surface. At the same time, each of the rear legs is rotated away from the associated main support leg to a position in which the foot portion can engage the underlying ground surface. The two vertical support members (which are hinged together) are then rotated into an upright orientation. Finally, the guitar stand can be spread open, with the brace used to fix the guitar stand into the deployed position. Once in the deployed position, the foldable guitar stand provides a stable support for a guitar or other instrument.

To return the guitar stand to a storage position, the brace is unlocked or released. The two vertical support members (which are hinged together) are folded together into an abutting relationship, and then are rotated downward and are received in the cavities defined above the respective support ledges of the main support legs. The rear legs are then rotated toward and into engagement with the respective main support leg. Specifically, the recess defined along the outer surface of each rear leg engages and mates with the complementary recess defined by the associated main support leg, such that each rear leg is nestled into and fits snugly against the associated main support leg. Once in the storage position, the foldable guitar stand can fit in the space that is in front of the neck support and under the headstock of the guitar when it is stored in the guitar case.

However, there remains a need for a similar stand that can accommodate multiple guitars and/or other instruments.

SUMMARY OF THE INVENTION

An exemplary foldable multi-instrument stand made in accordance with the present invention includes: two main support legs; a first pair of vertical support members that are hinged together and connected by a brace; and a second pair of vertical support members that are hinged together and connected by a brace.

With respect to the first pair of vertical support members, at the upper end of each vertical support member, there is a hinge portion that is secured to the inner surface of the respective vertical support member. The hinge portion secured to one vertical support member on one side of the stand is operably connected to and engages the hinge portion secured to the other vertical support member on the opposite side of the stand to create a butt hinge that facilitates pivotal movement of the vertical support members relative to one another.

Similarly, with respect to the second pair of vertical support members, at the upper end of each vertical support member, there is a hinge portion that is secured to the inner surface of the respective vertical support member. The hinge portion secured to one vertical support member on one side of the stand is operably connected to and engages the hinge portion secured to the other vertical support member on the opposite side of the stand to create a butt hinge that facilitates pivotal movement of the vertical support members relative to one another.

Returning now to the main support legs, each of the main support legs includes a substantially flat bottom portion that engages the underlying ground surface when the multi-instrument stand is in a deployed position. In front of the first pair of vertical support members, each of the main support legs defines one or more support ledges along its upper surface. The area above these support ledges effectively defines a first cavity for receiving the vertical support members in a storage position. Similarly, in front of the second pair of vertical support members, each of the main support legs defines one or more support ledges along its upper surface. The area above these support ledges effectively defines a second cavity for receiving the vertical support members in a storage position.

In a deployed position, each of the main support legs engages the underlying ground surface. The first pair of vertical support members (which are hinged together) is then rotated into an upright orientation. The second pair of vertical support members (which are hinged together) is also rotated into an upright orientation. As a further refinement, in some embodiments, the first pair of vertical support members is operably connected to the second pair of vertical support members by a linkage so that the pairs of vertical support members are effectively rotated together into an upright orientation (or rotated together back to the storage position). In any event, the multi-instrument stand can then be spread open, with the braces used to fix the multi-instrument stand into the deployed position. The multi-instrument stand can then accommodate two instruments.

To return the stand to a storage position, the braces are unlocked or released. The first vertical support members of the first pair (which are hinged together) are folded together into an abutting relationship, and then are rotated downward and are received in the first cavity defined above the respective support ledges of the main support legs. Similarly, the vertical support members of the second pair (which are hinged together) are folded together into an abutting relationship, and then are rotated downward and are received in the second cavity defined above the respective support ledges of the main support legs.

As a further refinement, an exemplary foldable multi-instrument stand made in accordance with the present invention can be constructed in a manner that permits the interconnection of multiple stands. Specifically, each of the first and second main support legs includes a male connector portion that extends from one end of each of the first and second main support legs and a corresponding receptacle defined at an opposite end of each of the first and second main support legs. Accordingly, a series of stands can be mated together, with the male connector portions of each of the first and second main support legs of one stand received in the corresponding receptacles defined at the opposite ends of each of the first and second main support legs of an adjacent stand.

DESCRIPTION OF THE DRAWINGS

FIG. 7 is an inside view of one side of the exemplary foldable multi-instrument stand of FIG. 1 in the deployed position;

FIG. 7A is a bottom view of one side of the exemplary foldable multi-instrument stand of FIG. 7;

FIG. 8 is an inside view of one side of the exemplary foldable multi-instrument stand of FIG. 1 in the storage position;

FIG. 8A is a bottom view of one side of the exemplary foldable multi-instrument stand of FIG. 8;

FIG. 9 is a side view of the main support leg of another exemplary foldable multi-instrument stand made in accordance with the present invention;

FIG. 9A is an end view of the main support leg of FIG. 9;

FIG. 9B is another end view of the main support leg of FIG. 9;

FIG. 9C is a bottom view of the main support leg of FIG. 9;

FIG. 10 is a view of the main support legs of three stands being mated to one another and interconnected;

FIG. 13 is a side view of two vertical support members for assembly with the main support leg of FIGS. 9 and 9A-C; and FIG. 14 is a side view of the assembled foldable multi-instrument stand, including the components shown in FIGS. 9, 9A-C and FIG. 13.

DETAILED DESCRIPTION OF THE INVENTION

The present invention is a foldable multi-instrument stand.

Figure 1:
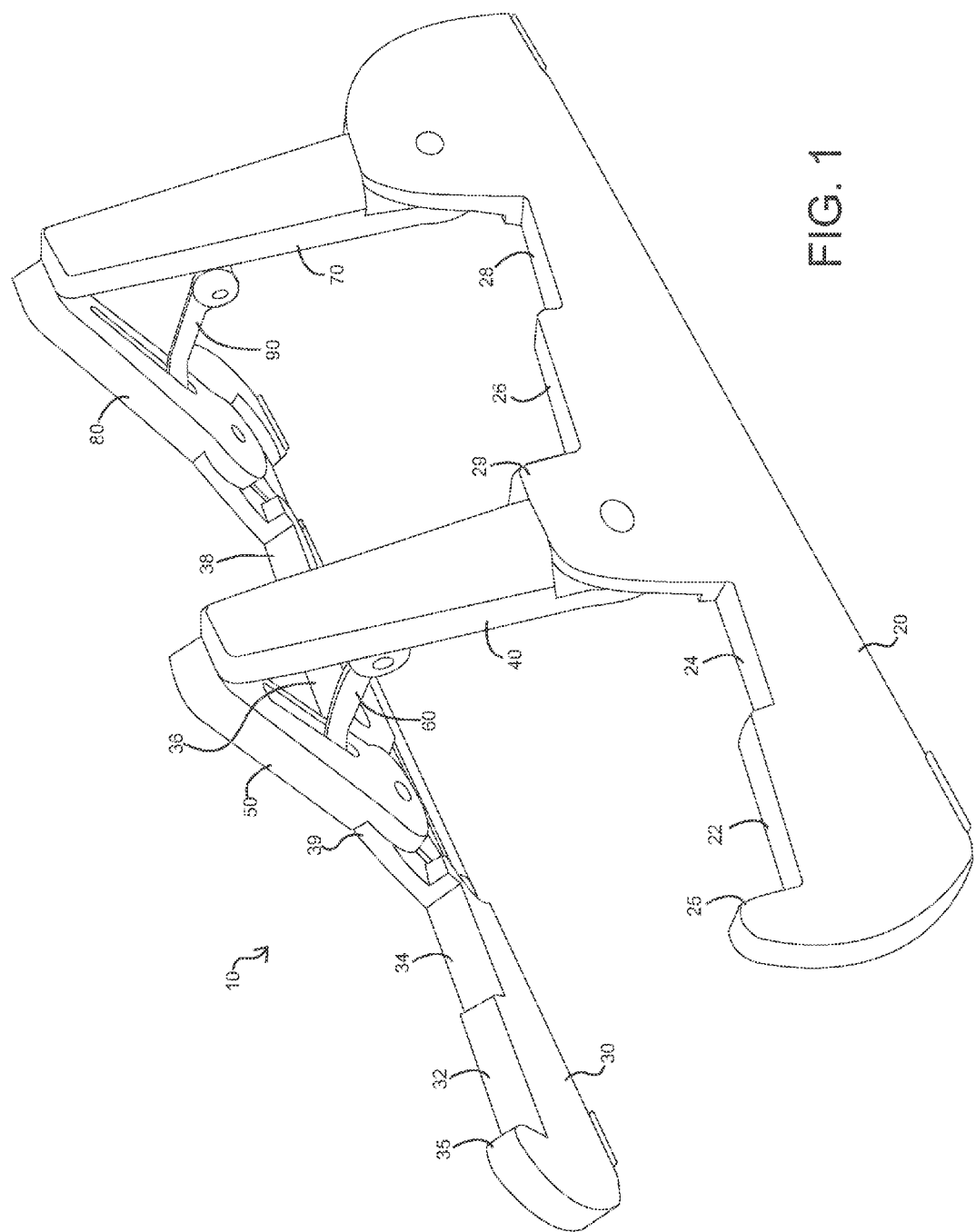
FIG. 1 is a perspective view of an exemplary foldable multi-instrument stand made in accordance with the present invention in a deployed position.
Figure 2:
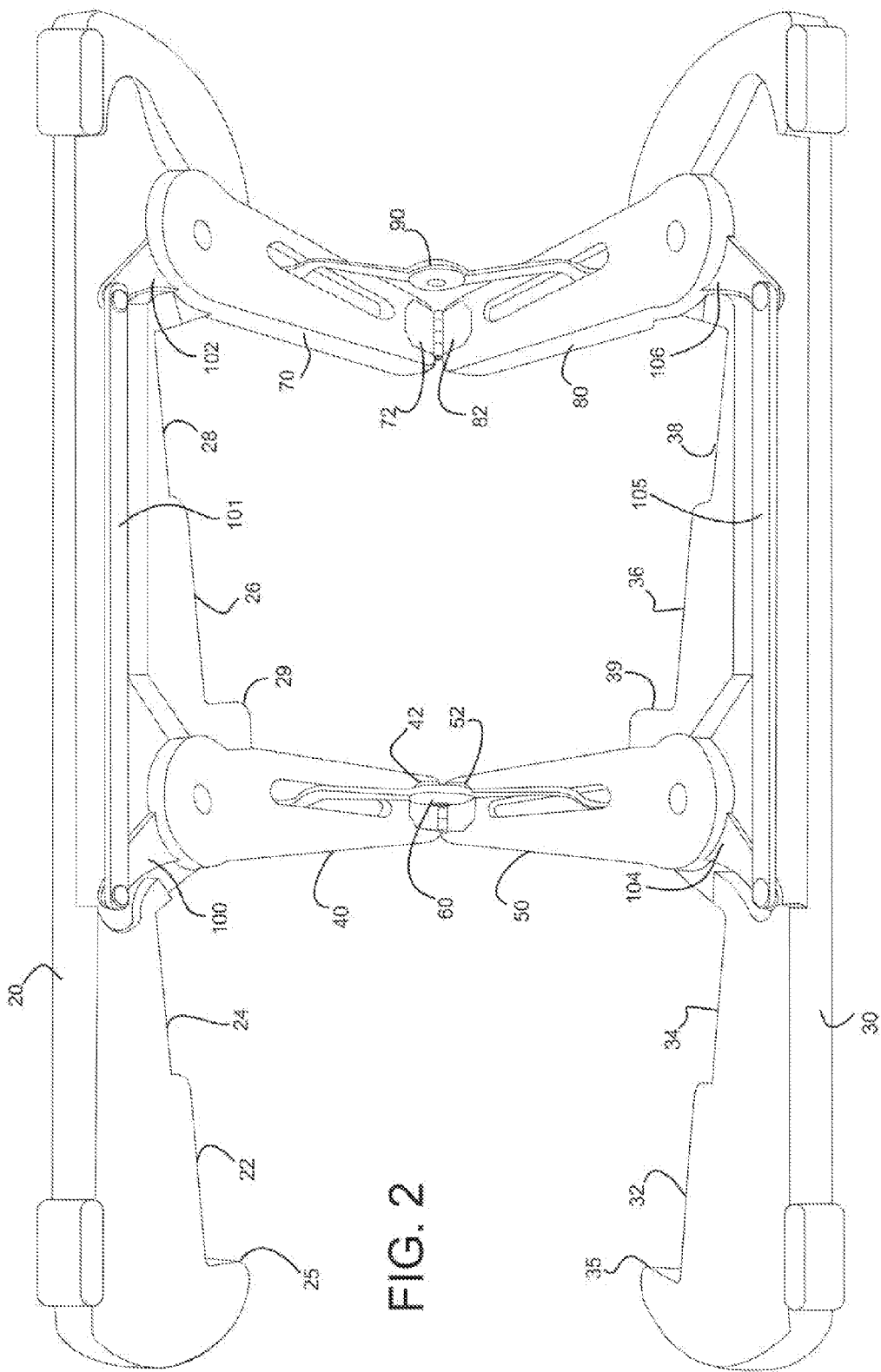
FIG. 2 is a bottom view of the exemplary foldable multi-instrument stand of FIG. 1 in the deployed position.
Figure 6:
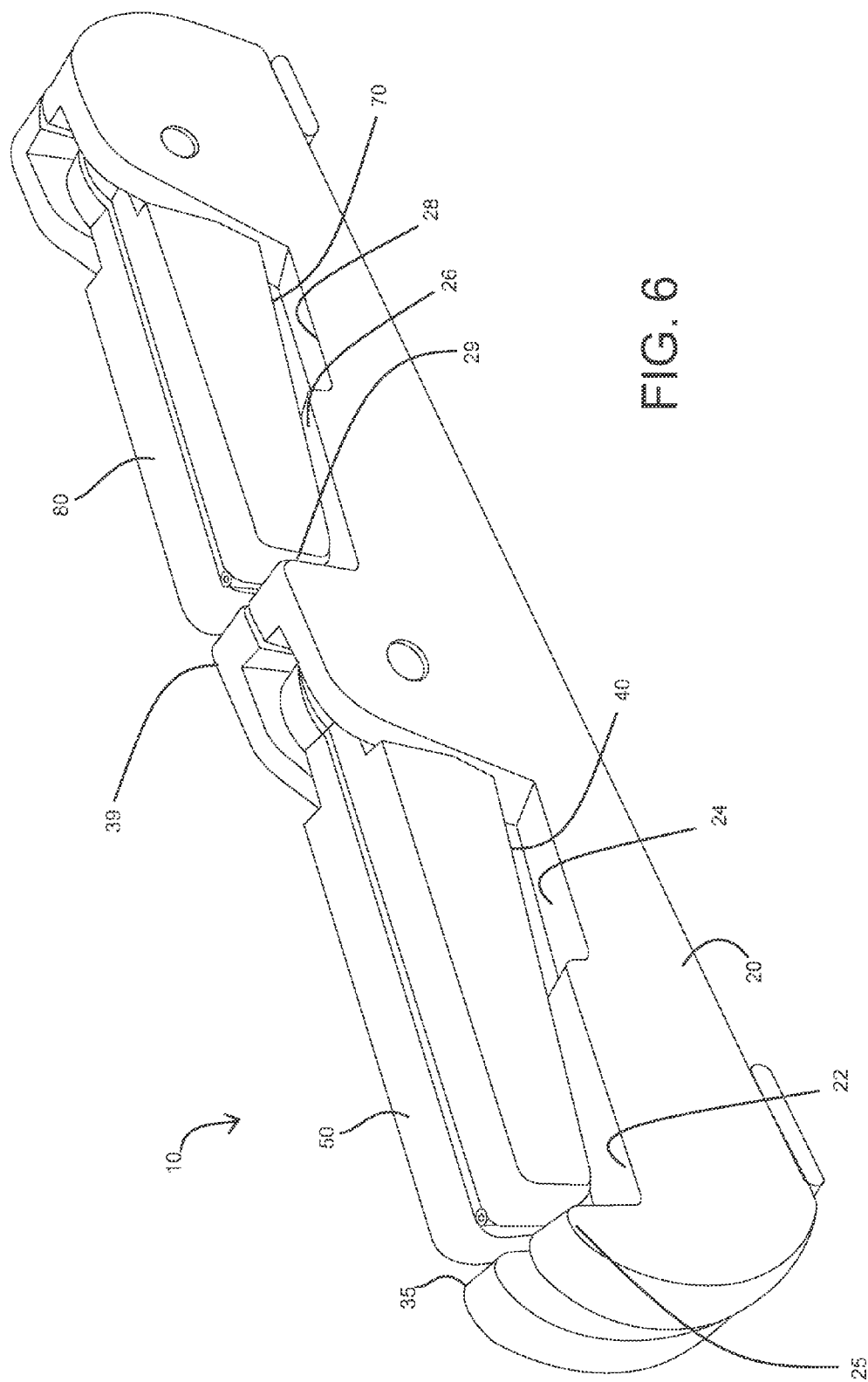
FIG. 6 is a side perspective view of the exemplary foldable multi-instrument stand of FIG. 1, wherein the stand has been folded into a storage position.
Figure 11A:
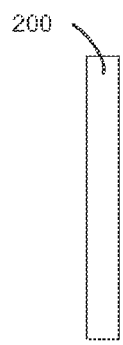
FIGS. 11 and 11A-C are views of an exemplary rear cap for attachment to a series of interconnected stands.
Figure 11:
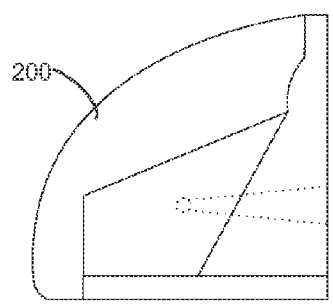
Figure 11B:
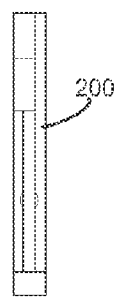
Figure 11C:
Figure 12A:
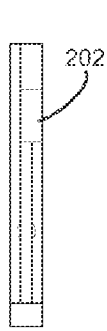
FIGS. 12 and 12A-C are views of an exemplary front cap for attachment to a series of interconnected stands.
Figure 12:
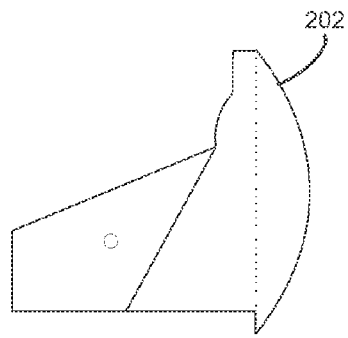
Figure 12B:
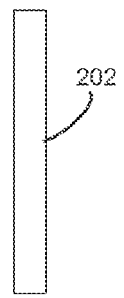
Figure 12C:
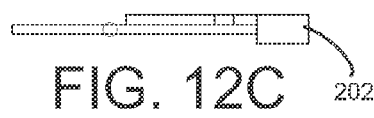

Referring now to FIGS. 1-2 and 6, an exemplary foldable multi-instrument stand 10 made in accordance with the present invention includes: a first main support leg 20; a second main support leg 30; a first pair of vertical support members 40, 50 that are hinged together and connected by a brace 60; and a second pair of vertical support members 70, 80 that are hinged together and connected by a brace 90.

With respect to the first pair of vertical support members 40, 50, the vertical support member 40 has an enlarged and flattened proximate end that defines a first forward hole. This first forward hole is placed in registry with a first forward corresponding hole defined through the first main support leg 20, such that a pin (for example, a screw post or a Chicago screw) can be inserted through the respective holes to facilitate pivotal movement of the vertical support member 40 relative to the first main support leg 20. Similarly, the vertical support member 50 has an enlarged and flattened proximate end that defines a second forward hole. This second forward hole is placed in registry with a second forward corresponding hole defined through the main support leg 30, such that a pin (for example, a screw post or a Chicago screw) can be inserted through the respective holes to facilitate pivotal movement of the vertical support member 50 relative to the main support leg 30.

As best shown in FIG. 2, at the upper end of each vertical support member 40, 50, there is a hinge portion 42, 52 that is secured to the inner surface of the respective vertical support member 40, 50. The hinge portion 42 secured to the vertical support member 40 is operably connected to and engages the hinge portion 52 secured to the other vertical support member 50 to create a butt hinge that facilitates pivotal movement of the respective vertical support members 40, 50 relative to one another.

Referring now to FIGS. 1-2 and 6, with respect to the second pair of vertical support members 70, 80, the vertical support member 70 has an enlarged and flattened proximate end that defines a first rear hole. This first rear hole is placed in registry with a first rear corresponding hole defined through the first main support leg 20, such that a pin (for example, a screw post or a Chicago screw) can be inserted through the respective holes to facilitate pivotal movement of the vertical support member 70 relative to the first main support leg 20. Similarly, the vertical support member 80 has an enlarged and flattened proximate end that defines a second rear hole. This second rear hole is placed in registry with a second rear corresponding hole defined through the main support leg 30, such that a pin (for example, a screw post or a Chicago screw) can be inserted through the respective holes to facilitate pivotal movement of the vertical support member 80 relative to the main support leg 30.

As best shown in FIG. 2, at the upper end of each vertical support member 70, 80, there is a hinge portion 72, 82 that is secured to the inner surface of the respective vertical support member 70, 80. The hinge portion 72 secured to the vertical support member 70 is operably connected to and engages the hinge portion 82 secured to the other vertical support member 80 to create a butt hinge that facilitates pivotal movement of the respective vertical support members 70, 80 relative to one another.

Returning now to the first and second main support legs 20, 30, each of the main support legs 20, 30 includes a substantially flat bottom portion that engages the underlying ground surface when the multi-instrument stand 10 is in a deployed position. In front of the first pair of vertical support members 40, 50, each of the main support legs 20, 30 defines two support ledges 22, 24, 32, 34 along its upper surface, which terminate at a stop 25, 35. The area above these support ledges 22, 24, 32, 34 effectively defines a first cavity for receiving the vertical support members 40, 50 in a storage position, as is further described below. Similarly, in front of the second pair of vertical support members 70, 80, each of the main support legs 20, 30 defines two support ledges 26, 28, 36, 38 along its upper surface, which terminate at a stop 29, 39. The area above these support ledges 26, 28, 36, 38 effectively defines a second cavity for receiving the vertical support members 70, 80 in a storage position, as is further described below.

Figure 3:
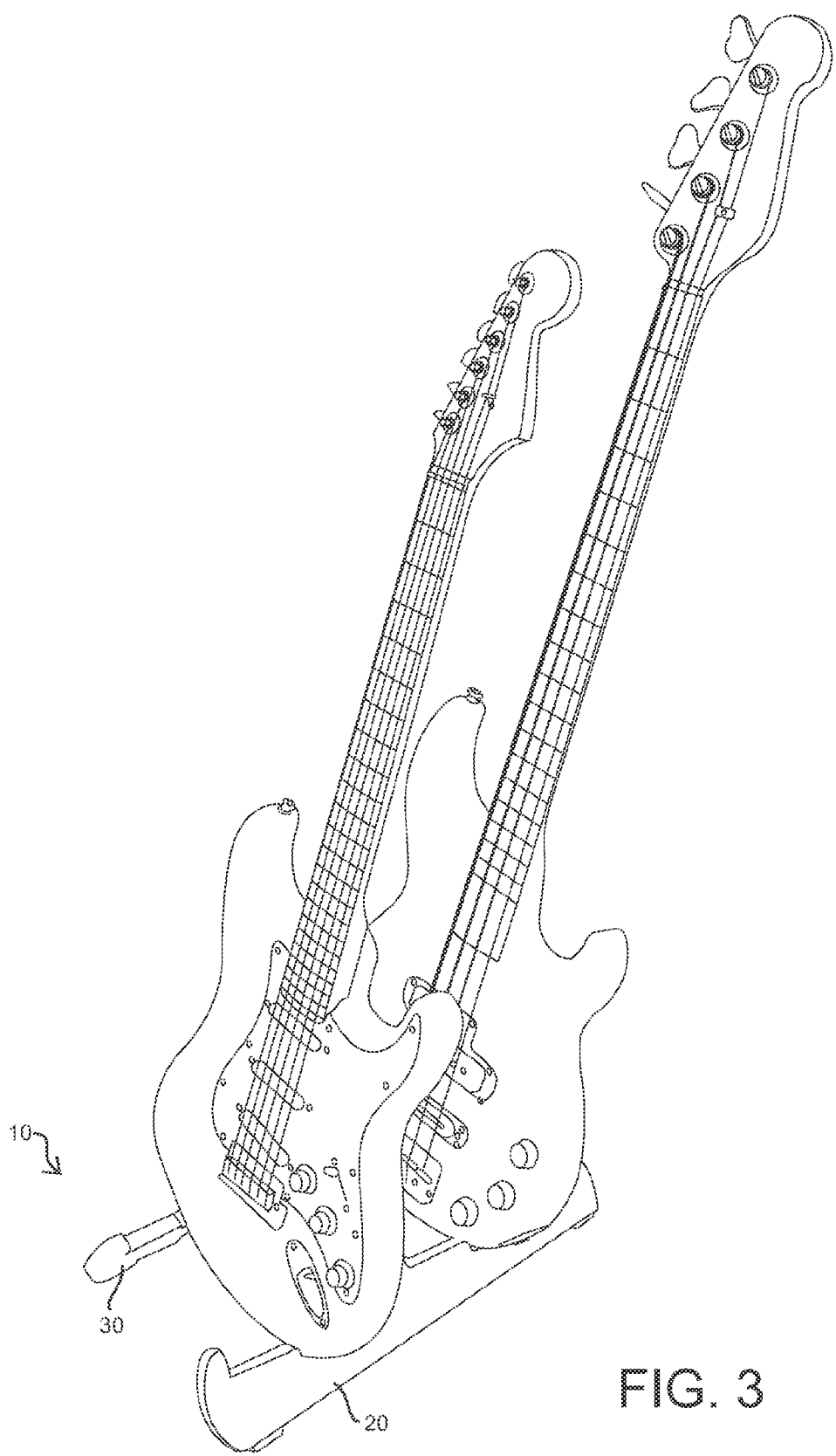
FIG. 3 is a view of the exemplary foldable multi-instrument stand of FIG. 1 in which the stand is supporting two electric guitars.
Figure 4:
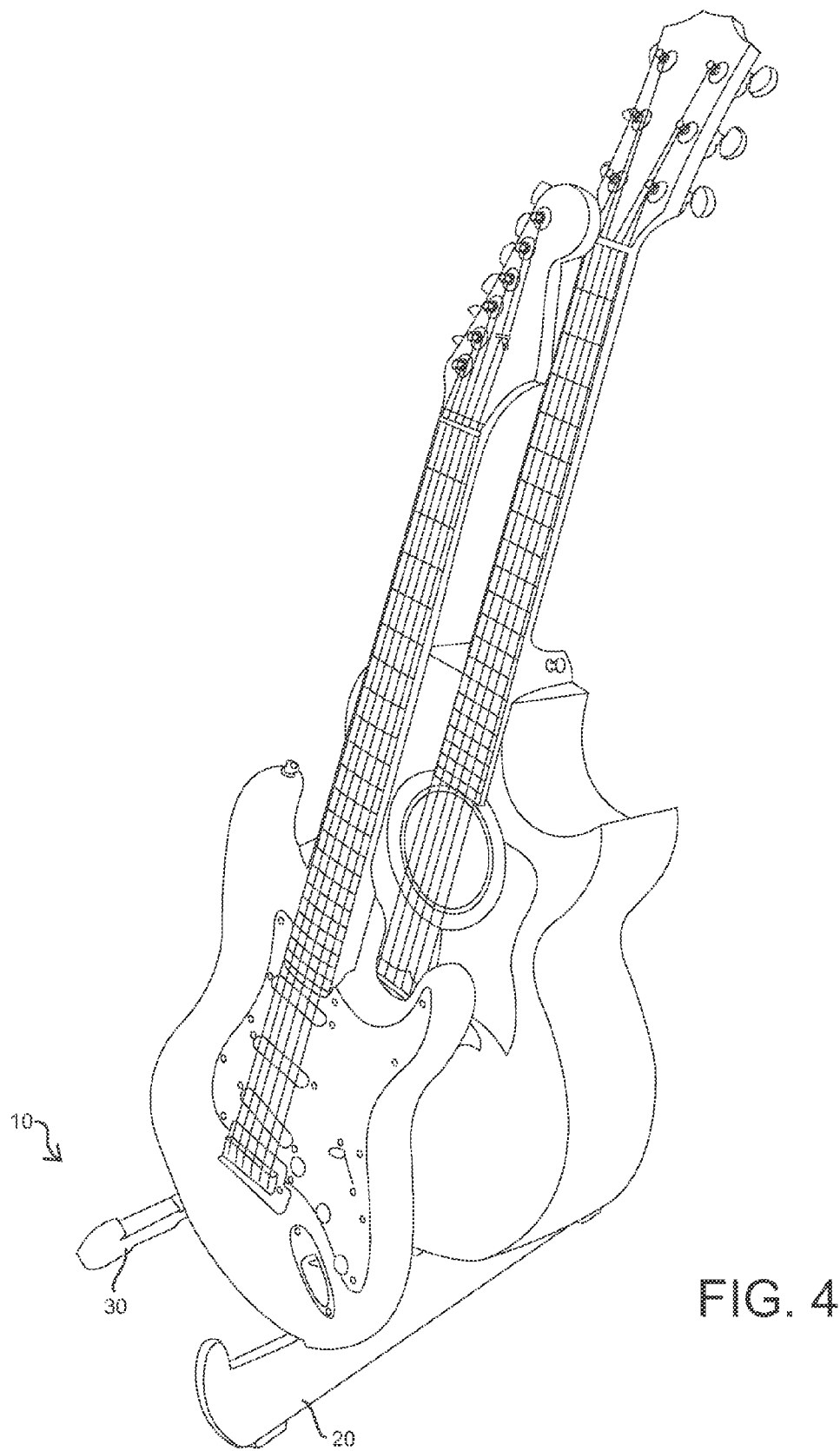
FIG. 4 is a view of the exemplary foldable multi-instrument stand of FIG. 1 in which the stand is supporting an electric guitar and an acoustic guitar.
Figure 5:
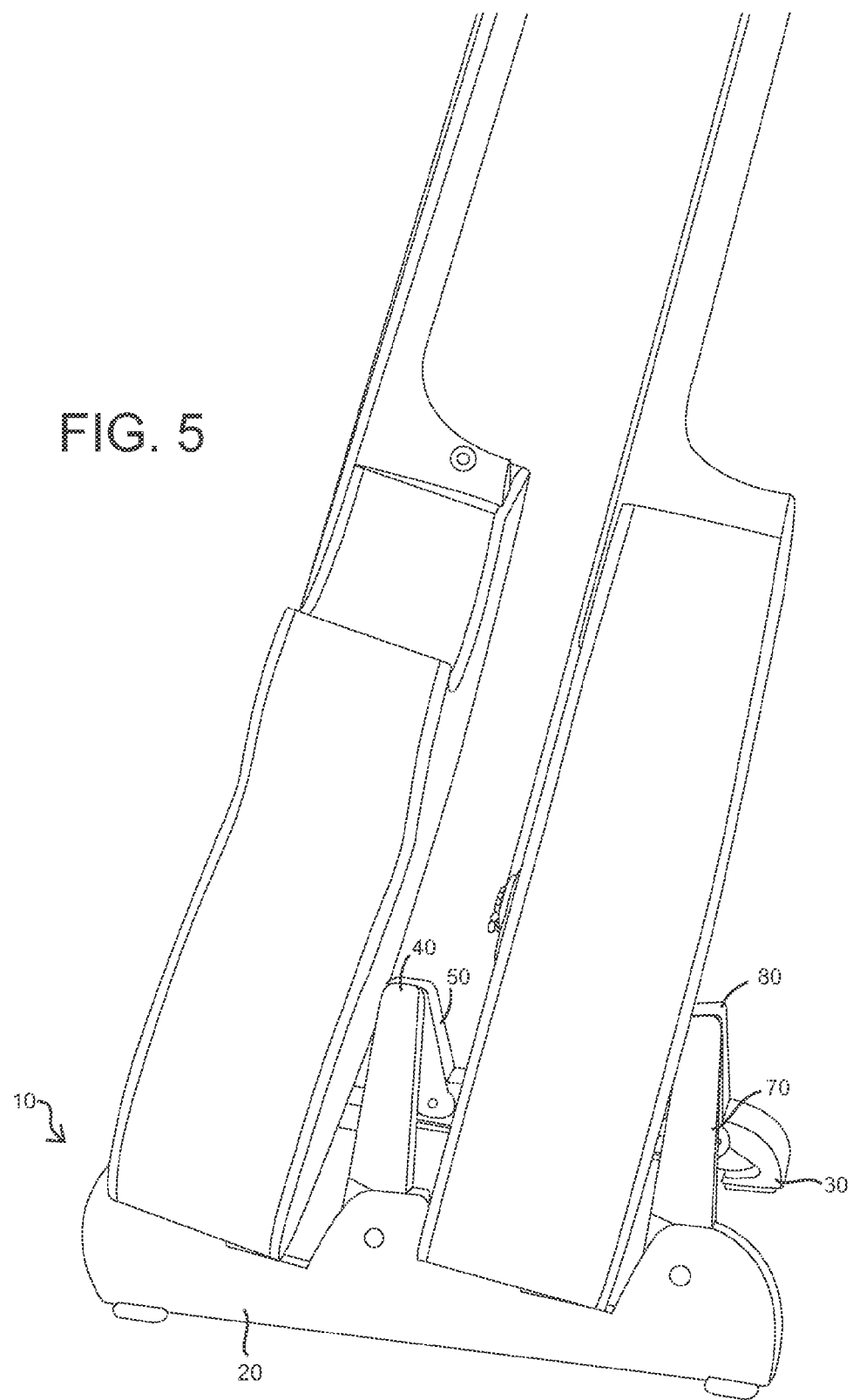
FIG. 5 is a side view of the exemplary foldable multi-instrument stand of FIG. 1 in which the stand is supporting two acoustic guitars.

Referring now to FIGS. 3-5, in a deployed position, each of the main support legs 20, 30 engages the underlying ground surface. The first pair of vertical support members 40, 50 (which are hinged together) is then rotated into an upright orientation. The second pair of vertical support members 70, 80 (which are hinged together) is also rotated into an upright orientation. Indeed, in this exemplary embodiment, and as best shown in FIGS. 2, 7, and 8, the first pair of vertical support members 40, 50 is operably connected to the second pair of vertical support members 70, 80. Specifically, on one side of the multi-instrument stand 10, a first link 100 (i.e., first front link) extends from a lower portion (i.e., a proximate end) of the vertical support member 40 and rotates with the vertical support member 40. Similarly, a second link 102 (i.e., first rear link) extends from a lower portion (i.e., a proximate end) of the vertical support member 70 and rotates with the vertical support member 70. A linkage 101 (i.e., a first linkage) extends between and operably connects the first and second links 100, 102 to one another. On the other side of the multi-instrument stand 10, a first link 104 (i.e., second front link) extends from a lower portion (i.e., proximate end) of the vertical support member 50 and rotates with the vertical support member 50. Similarly, a second link 106 (i.e., second rear link) extends from a lower portion of the vertical support member 80 and rotates with the vertical support member 80. A linkage 105 (i.e., a second linkage) extends between and operably connects the first and second links 104, 106 to one another. Thus, the pairs of vertical support members 40, 50, 70, 80 are effectively rotated together into an upright orientation (or rotated together back to the storage position).

Furthermore, as best shown in FIGS. 7 and 8, when the vertical support members 40, 50, 70, 80 are rotated, the linkage 101 (i.e., the first linkage) remains immediately adjacent to an interior side surface of the first main support leg 20, the first linkage moving substantially parallel to the interior side surface. Similarly, as can be seen in FIG. 2, when the vertical support members 40, 50, 70, 80 are rotated the linkage 105 (i.e., the second linkage) similarly remains immediately adjacent to an interior side surface of the second main support leg 30, the second linkage moving substantially parallel to the interior side surface of the second main support leg.

Referring now to FIGS. 3-5, the multi-instrument stand 10 can then be spread open, with the braces 60, 90 used to fix the multi-instrument stand 10 into the deployed position. The multi-instrument stand 10 can then accommodate two instruments, for example, two electric guitars (FIG. 3), an electric guitar and an acoustic guitar (FIG. 4), or two acoustic guitars (FIG. 5). One instrument extends across and is supported on one or both of the pairs of support ledges 22, 24, 32, 34 of the main support legs 20, 30 in front of the first pair of vertical support members 40, 50, and the second instrument extends across and is supported on one or both of the pairs of support ledges 26, 28, 36, 38 of the main support legs 20, 30 in front of the second pair of vertical support members 70, 80. As best shown in FIG. 5, the instruments are inclined slightly backward, resting against the respective vertical support members 40, 50, 70, 80.

To return the stand to a storage position, as shown in FIG. 6, the braces 60, 90 are unlocked or released. The vertical support members 40, 50 (which are hinged together) are folded together into an abutting relationship, and then are rotated downward and are received in the first cavity defined above the respective support ledges 22, 24, 32, 34 of the main support legs 20, 30. Similarly, the vertical support members 70, 80 (which are hinged together) are folded together into an abutting relationship, and then are rotated downward and are received in the second cavity defined above the respective support ledges 26, 28, 36, 38 of the main support legs 20, 30.

Although the multi-instrument stand 10 described above is designed to accommodate two instruments, it should be recognized and understood that more than two instruments could be accommodated through the use of additional pairs of vertical support members that are operably connected to the main support legs.

To provide a further understanding of the structure and function of the multi-instrument stand 10, FIG. 7 is an inside view of one side of the multi-instrument stand 10, including the first main support leg 20 and the vertical support members

40, 70. FIG. 7A is a bottom view of the same assembly of components on one side of the multi-instrument stand 10.

FIGS. 8 and 8A are substantially identical to FIGS. 7 and 7A, but show the multi-instrument stand 10 in a storage position.

Although not shown in FIGS. 1-8, as a further refinement, one or more protective strips could be applied to upper surfaces of the first and second main support legs 20, 30, including the support ledges, along with the vertical support members 40, 50, 70, 80. Such protective strips could be made of rubber or other suitable material to provide additional support to an instrument (or instruments) and to prevent the multi-instrument stand 10 from damaging the instrument.

Referring now to FIGS. 9-13, as a further refinement, an exemplary foldable multi-instrument stand 110 made in accordance with the present invention can be constructed in a manner that permits the interconnection of multiple stands. Specifically, and referring first to FIGS. 9, 9A, and 9B, the first main support leg 120 of such a multi-instrument stand 110 includes a substantially flat bottom portion that engages the underlying ground surface when the multi-instrument stand 110 is in a deployed position. Similar to the embodiment described above with respect to FIGS. 1-8, the first main support leg 120 defines two support ledges 122, 124 along its upper surface, which terminate at a stop 125. The first main support leg 120 also defines two support ledges 126, 128 along its upper surface, which terminate at a stop 129. Unlike the embodiment described above with respect to FIGS. 1-8, however, the first main support leg 120 of this multi-instrument stand 110 includes a male connector portion 116 that extends from one end (i.e., the rear) of the first main support leg 120 and a corresponding receptacle 118 defined at an opposite end (i.e., the front) of the first main support leg 120. Of course, the other main support leg (not shown) of the multi-instrument stand 110 would be similarly constructed. Accordingly, a series of stands can be mated together, with the male connector portions of each of the first and second main support legs of one stand received in the corresponding receptacles defined at the opposite ends of each of the first and second main support legs of an adjacent stand. For example, FIG. 10 shows the main support legs 120a, 120b, 120c of three stands 110a, 110b, 110c being mated to one another and interconnected.

As a further refinement, FIG. 10 also shows that the series of interconnected stands 110a, 110b, 110c can be capped at either end by a rear cap 200 and a front cap 202 to complete the assembly. FIGS. 11 and 11A-C provide additional views of an exemplary rear cap 200, and FIGS. 12 and 12A-C provide additional views of an exemplary front cap 202 for use with a series of interconnected stands.

With respect to the multi-instrument stand 110 described above, it also would include first and second pairs of vertical support members, and two such vertical support members 140, 170 are shown in FIG. 13. Similar to the embodiment described above with respect to FIGS. 1-8, each of these vertical support members 140, 170 has a proximate end that defines a hole. This hole is placed in registry with a corresponding hole defined through the first main support leg 120, such that a pin (for example, a screw post or a Chicago screw) can be inserted through the respective holes to facilitate pivotal movement of the vertical support members 140, 170 relative to the first main support leg 120. Of course, the vertical support members (not shown) on the other side of the multi-instrument stand 110 would be similarly constructed. FIG. 13 also shows that, like the embodiment described above with respect to FIGS. 1-8, a linkage 174 extends between and operably connects the vertical support members 140, 170.

Finally, FIG. 14 shows the assembled multi-instrument stand 110 in a storage position and capped at either end by a rear cap 200 and a front cap 202.

With respect to the above-described embodiments or any other multi-instrument stand made in accordance with the present invention, it should be recognized and understood that such a multi-instrument stand has a minimal number of moving parts, is compact and portable, has excellent strength and stability, and has no sharp edges or other parts that could damage the instruments. The multi-instrument stand has a wide stance with a low center of gravity and incorporates the body weight and dimensions of the instruments as a further stabilizer. The components of the stand could also be constructed from metal, plastic, or other materials without departing from the spirit and scope of the present invention. Lastly, the multi-instrument stand will allow for support of an instrument with electrical connections, as the angled electrical jack on the bout of guitars will not be obstructed by the stand.

One of ordinary skill in the art will also recognize that additional embodiments and configurations are also possible without departing from the teachings of the present invention or the scope of the claims which follow. This detailed description, and particularly the specific details of the exemplary embodiments disclosed, is given primarily for clarity of understanding, and no unnecessary limitations are to be understood therefrom, for modifications will become obvious to those skilled in the art upon reading this disclosure and may be made without departing from the spirit or scope of the claimed invention.

The invention claimed is:

1. A foldable multi-instrument stand, comprising:

a first main support leg;

a second main support leg;

a first pair of vertical support members, with a proximate end of one of the first pair of vertical support members connected to the first main support leg and a proximate end of a second of the first pair of vertical support members connected to the second main support leg, the first pair of vertical support members configured for pivotal movement into an upright orientation relative to the first main support leg and the second main support leg when the stand is in a deployed position;

a second pair of vertical support members, with a proximate end of one of the second pair of vertical support members connected to the first main support leg and a proximate end of a second of the second pair of vertical support members connected to the second main support leg, the second pair of vertical support members configured for pivotal movement into an upright orientation relative to the first main support leg and the second main support leg when the stand is in the deployed position; and a first linkage operably connecting the proximate end of the one vertical support member of the first pair with the proximate end of the one vertical support member of the second pair, such that the first and second pairs of vertical support members are effectively rotated together;

wherein, upon rotation of the vertical support members, the first linkage remains immediately adjacent to an interior side surface of the first main support leg;

wherein the first main support leg and the second main support leg each define one or more support ledges along their respective upper surfaces in front of the first pair of vertical support members, the one or more support ledges accommodating and providing support for an instrument when the stand is in the deployed position, and wherein an area above the one or more support ledges defines a first cavity for receiving the first pair of vertical support members when the stand is in a storage position; and wherein the first main support leg and the second main support leg each define one or more support ledges along their respective upper surfaces in front of the second pair of vertical support members, thereby accommodating and providing support for another instrument when the stand is in the deployed position, and wherein an area above the one or more support ledges in front of the second pair of vertical support members defines a second cavity for receiving the second pair of vertical support members when the stand is in the storage position.

2. The foldable multi-instrument stand as recited in claim 1, and further comprising:
a first hinge that operably joins the vertical support members of the first pair to one another; and
a second hinge that operably joins the vertical support members of the second pair to one another.

3. The foldable multi-instrument stand as recited in claim 2, and further comprising:
a first brace that connects the vertical support members of the first pair to one another; and
a second brace that connects the vertical support members of the second pair to one another.

4. The foldable multi-instrument stand as recited in claim 1,
wherein the proximate end of the one vertical support member of the first pair of vertical support members is an enlarged proximate end that defines a first forward hole, with the first forward hole being placed in registry with a first forward corresponding hole defined through the first main support leg, with a pin then inserted through the first forward hole and the first forward corresponding hole to facilitate the pivotal movement of the one of the first pair of vertical support members relative to the first main support leg;
wherein the proximate end of the second vertical support member of the first pair of vertical support members is an enlarged proximate end that defines a second forward hole, with the second forward hole being placed in registry with a second forward corresponding hole defined through the second main support leg, with a pin then inserted through the second forward hole and the second forward corresponding hole to facilitate the pivotal movement of the second of the first pair of vertical support members relative to the second main support leg;
wherein the proximate end of the one vertical support member of the second pair of vertical support members is an enlarged proximate end that defines a first rear hole, with the first rear hole being placed in registry with a first rear corresponding hole defined through the first main support leg, with a pin then inserted through the first rear hole and the first rear corresponding hole to facilitate the pivotal movement of the one of the second pair of vertical support members relative to the first main support leg; and
wherein the proximate end of the second vertical support member of the second pair of vertical support members is an enlarged proximate end that defines a second rear hole, with the second rear hole being placed in registry with a second rear corresponding hole defined through the second main support leg, with a pin then inserted through the second rear hole and the second rear corresponding hole to facilitate the pivotal movement of the second of the second pair of vertical support members relative to the second main support leg.

5. The foldable multi-instrument stand as recited in claim 1, wherein the first main support leg and the second main support leg each define at least two of the one or more support ledges along their respective upper surfaces in front of the first pair of vertical support members.

6. The foldable multi-instrument stand as recited in claim 5, wherein the first main support leg and the second main support leg each define at least two of the one or more support ledges along their respective upper surfaces in front of the second pair of vertical support members.

7. The foldable multi-instrument stand as recited in claim 1, wherein each of the first and second main support legs includes a male connector portion that extends from a respective first end of each of the first and second main support legs and a corresponding receptacle defined at a respective second end of each of the first and second main support legs, such that the foldable multi-instrument stand can be mated and interconnected with one or more adjacent foldable multi-instrument stands.

8. The foldable multi-instrument stand as recited in claim 1, and further comprising a second linkage operably connecting the proximate end of the second vertical support member of the first pair of vertical support members with the proximate end of the second vertical support member of the second pair of vertical support members;
wherein, upon rotation of the vertical support members, the second linkage remains immediately adjacent to an interior side surface of the second main support leg.

9. The foldable multi-instrument stand as recited in claim 1, wherein, upon rotation of the vertical support members, the first linkage moves substantially parallel to the interior side surface of the first main support leg.

10. The foldable multi-instrument stand as recited in claim 8, wherein, upon rotation of the vertical support members, the first linkage moves parallel to the interior side surface of the first main support leg and the second linkage moves substantially parallel to the interior side surface of the second main support leg.

11. A foldable multi-instrument stand, comprising:
a first main support leg;
a second main support leg;
a first pair of vertical support members connected to the first main support leg and the second main support leg, the first pair of vertical support members configured for pivotal movement into an upright orientation relative to the first main support leg and the second main support leg when the stand is in a deployed position;
a second pair of vertical support members connected to the first main support leg and the second main support leg, the second pair of vertical support members configured for pivotal movement into an upright orientation relative to the first main support leg and the second main support leg when the stand is in the deployed position;
a first front link extending from a proximate end of one of the first pair of vertical support members;
a second front link extending from a proximate end of a second of the first pair of vertical support members;
a first rear link extending from a proximate end of one of the second pair of vertical support members;
a second rear link extending from a proximate end of a second of the second pair of vertical support members;
a first linkage operably connecting the first front link and the first rear link; and a second linkage operably connecting the second front link and the second rear link, such that the first and second pairs of vertical support members are effectively rotated together;

wherein the first main support leg and the second main support leg each define one or more support ledges along their respective upper surfaces in front of the first pair of vertical support members, the one or more support ledges accommodating and providing support for an instrument when the stand is in the deployed position, and wherein an area above the one or more support ledges defines a first cavity for receiving the first pair of vertical support members when the stand is in a storage position; and wherein the first main support leg and the second main support leg each define one or more support ledges along their respective upper surfaces in front of the second pair of vertical support members, thereby accommodating and providing support for another instrument when the stand is in the deployed position, and wherein an area above the one or more support ledges in front of the second pair of vertical support members defines a second cavity for receiving the second pair of vertical support members when the stand is in the storage position.

* * * * *